Aug. 10, 1937.　　　T. B. FUNK　　　2,089,887

LAWN MOWER CUTTER BAR

Filed Feb. 11, 1935

Inventor
Truman B. Funk
By Beaman & Langford
Attorney

Patented Aug. 10, 1937

2,089,887

UNITED STATES PATENT OFFICE 2,089,887

LAWN MOWER CUTTER BAR

Truman B. Funk, Jackson, Mich., assignor to "Yard-Man", Inc., Jackson, Mich., a corporation of Michigan Application February 11, 1935, Serial No. 5,890

2 Claims. (Cl. 56—294)

This invention relates to lawn mower cutter bars and more particularly to a cutter bar including an integral cutter blade.

To my knowledge all lawn mowers heretofore manufactured having a rotating cutting reel and stationary cutter bar have been of cast iron and supported a steel cutting blade held in position by rivets or screws, or of sheet metal. The cast iron cutter bar has taken the form of a heavy, bulky casting in order to obtain the required strength and rigidity, and the sheet metal cutter bar has lacked rigidity and permanence.

In prior practices of the above character, the weight of the cast iron cutter bar has constituted a substantial portion of the entire weight of the lawn mower. As the cutter bar is usually forward or rearward of the ground wheels the concentration of weight is not inducive to easy handling of the lawn mower during operation. In addition, the cost of machining and assembling the cutter bar and blade constitute a sizable part of the entire cost of the mower. To replace a worn cutting blade it is the usual practice to machine a new blade to enable the same to be riveted in position upon the old cutter bar.

An object of this invention is to overcome the above difficulties by providing a complete lawn mower cutter bar including the cutting blade, of a unitary strip of carbon tool steel.

Another object of this invention is to provide a lawn mower cutter bar including the cutting blade, of a unitary rolled strip of carbon tool steel having a reinforcing rib.

A further object is to provide a unitary cutter bar including the cutting blade arranged for ready attachment to and removal from lawn mowers.

Figure 1:
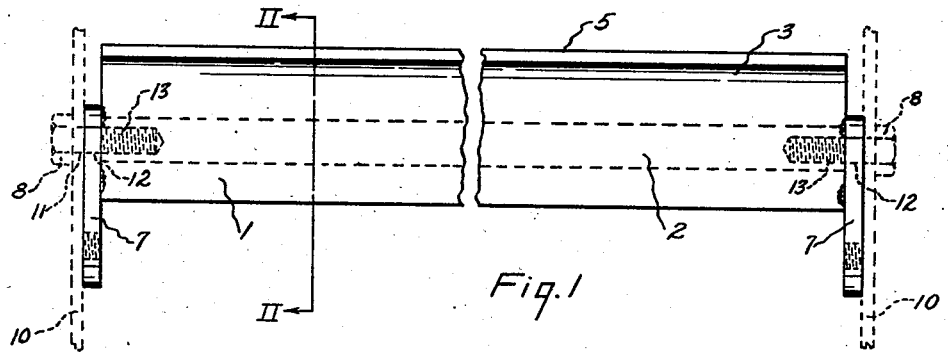
Figures 2, 4:
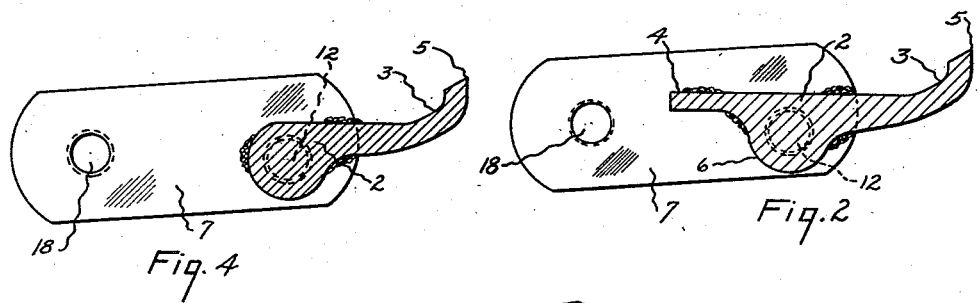
Figure 3:
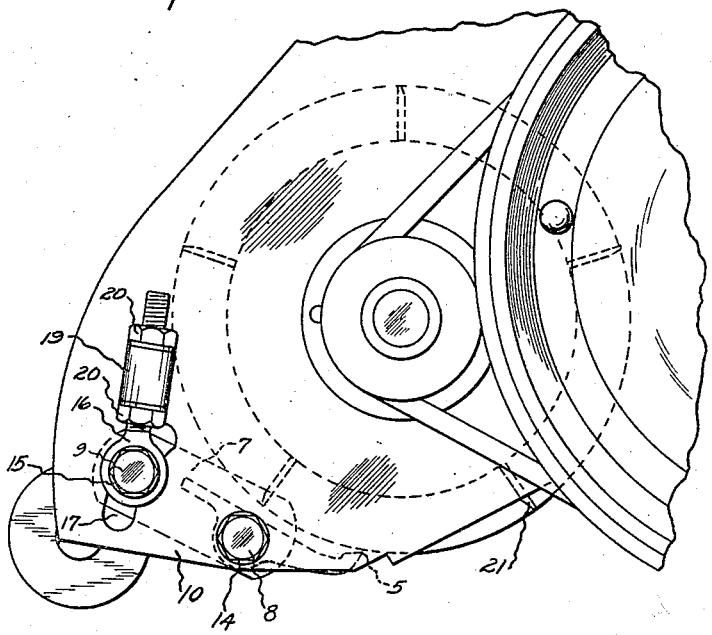

These and other objects will be apparent from the following specification when taken with the accompanying drawing in which Fig. 1 is a plan view of my improved cutter bar, Fig. 2 is a section on the line II—II of Fig. 1, and Fig. 3 is a partial side elevation of a lawn mower showing my improved cutter bar attached thereto, Fig. 4 is a view similar to Fig. 2 showing a modified form of cutter bar not having a trailing edge opposite the cutting blade.

Referring particularly to Figs. 1 and 2 of the drawing the reference character 1 indicates the cutter bar which has a body 2, a forwardly extending upwardly inclined cutting blade portion 3 and a rear trailing edge portion 4. The edge of the cutting blade portion 3 is ground to provide a cutting edge 5. The bar is a single piece of rolled carbon tool steel and in manufacture may be cut from long strips. It is preferred that the bar 1 have a carbon content of from .80 to .95 per cent. This percentage, however, is not part of the invention and it is intended that any steel be used which is suitable for a shearing edge.

Disposed beneath the body portion 2, between the trailing edge 4 and the cutting blade 3 is a downwardly extending rib 6, the function of which is to stiffen the bar 1.

The bar 1 is directly supported by end plates 7 to which it is welded as shown. Bolts 8 and 9 secure the end plates 7 to the frame plates 10 comprising portions of the lawn mower structure. The bolts 8 pass through holes 11 in the frame plates 10, holes 12 in the end plates 7, and are threaded into tapped holes 13 in the ribs 6. Washers 14 space the heads of the bolts 8 from the frame plates 10. The bolts 9 pass through washers 15, adjusting eye bolts 16, adjusting slots 17 in the frame plates 10 and into tapped holes 18 in the end plates 7. The adjusting eye bolts pass through sleeves 19 rigidly attached to the frame plates 10 and are vertically adjustable with respect thereto by the nuts 20. It will thus be obvious that by loosening the bolts 8 and 9 and vertically adjusting the eye bolts 16, the cutting edge 5 may be pivoted about the bolt 8 to provide any required adjustment with respect to the cutting reel blades 21.

According to this invention the rolled stock from which the cutter bar 1 is made is cut into desired lengths, drilled and tapped. Then it is heat treated in the usual way to provide the cutting edge with the proper degree of hardness. The finished cutter bar is very much lighter in weight than former combined cast iron and steel types and can be produced at a much lower cost due principally to reduced labor costs. Furthermore, an additional advantage of the lighter weight lies in the fact that the lawn mower on which it is used can be operated more easily and shipping charges are reduced. While it is true that according to this invention, in order to replace the cutting edge the entire cutter bar must be replaced rather than the cutting blade alone as has heretofore been done, the cost of my entire cutter bar is approximately the same as the cutting blade of the prior art.

The foregoing description is illustrative only and I do not wish to be limited except by the scope of the following claims.

I claim:

1. An integral cutter bar and cutting blade for use in lawn mowers having a rotated cutting reel, said integral structure being entirely formed from a section of rolled high carbon steel as distinguished from a sheet metal strip of uniform thickness shaped to the desired contour, in cross-section said integral structure being of varying thickness with a well defined thickened longitudinally extending stiffening rib of substantially equal width and thickness and constituting a minor portion of the width of said structure, a longitudinally extending cutting blade portion merging with said rib and being less than one-half the thickness thereof, the width of said blade portion being greater than said rib and terminating in a longitudinally extending upward turned cutting edge portion, excepting the thickened rib portion, said integral structure being otherwise of relatively uniform thickness in cross-section.

2. In a lawn mower having a cutting reel, an integral cutter bar and cutting blade formed from a section of rolled high carbon steel, said section being relatively thin and of substantially uniform cross-section throughout the major portion of its width to define a cutting blade portion terminating in an upward turned edge and an intermediate web portion, a rib of substantially greater thickness than said blade and web portion into which said web portion merges, said rib being disposed along one side of said web and blade portions and acting to stiffen the same, plates attached at opposite ends thereof for receiving means for adjusting said cutter bar and cutting blade, said rib at the ends of said section being shaped to receive pivots about which the cutter bar and cutting blade is oscillated to provide adjustment.

TRUMAN B. FUNK.